Patented Apr. 15, 1941

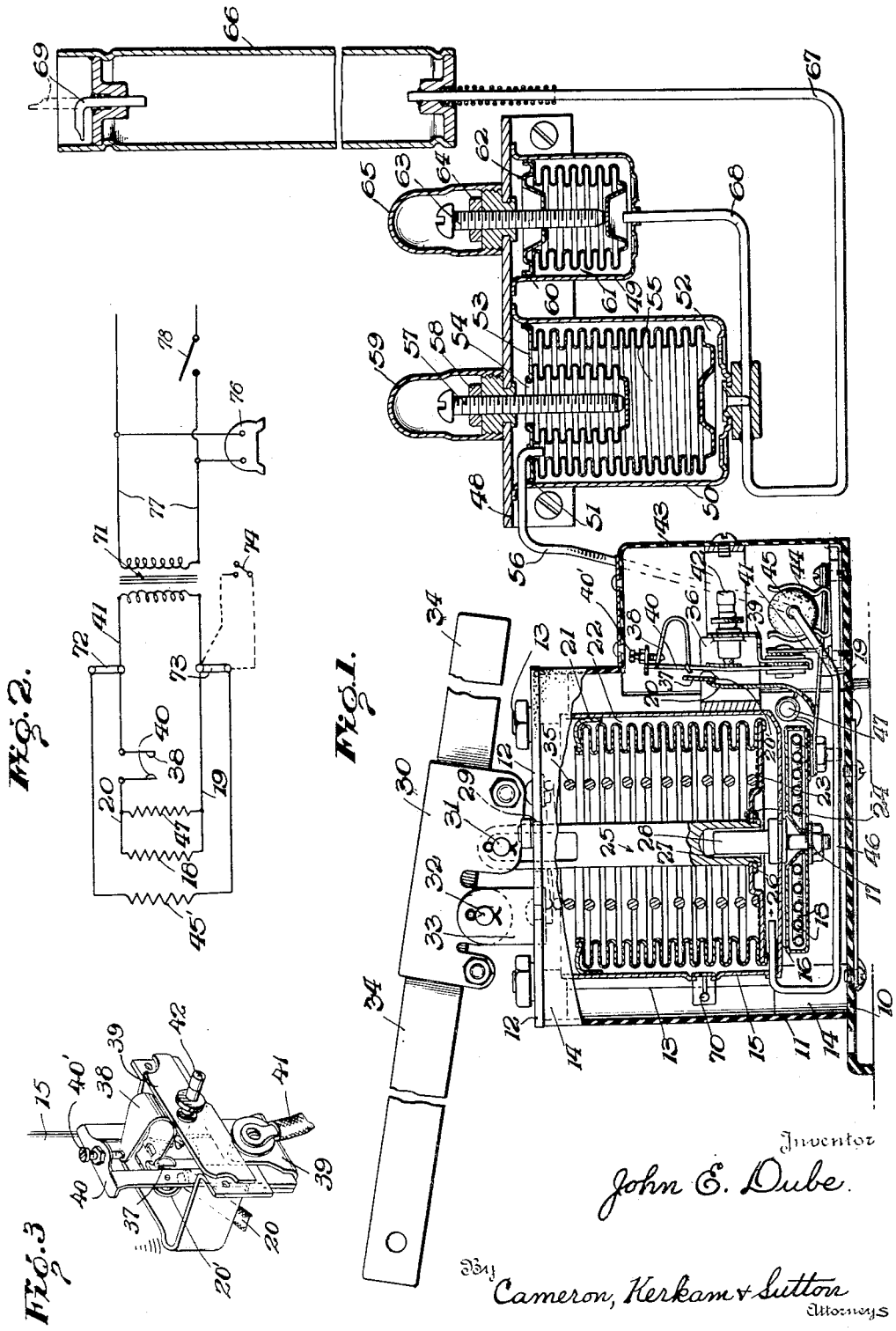

2,238,807

UNITED STATES PATENT OFFICE 2,238,807

DAMPER MOTOR

John E. Dube, Knoxville, Tenn., assignor to The Fulton Sylphon Company, Knoxville, Tenn., a corporation of Delaware Application May 5, 1938, Serial No. 206,266

23 Claims. (Cl. 236—68)

This invention relates to damper motors and more particularly to damper motors providing modulated control for dampers in unit ventilators and similar devices and operating on the liquid expansion hot chamber principle.

Heretofore damper motors have been used which operate on the liquid expansion hot chamber principle but in these little or no attempt has been made to so control the damper motor as to allow automatic or manual selection of any desired minimum air stream position of the dampers.

It is accordingly an object of this invention to provide a novel damper motor operating on the liquid expansion hot chamber principle in which any desired minimum air stream position of the damper may be manually or automatically selected.

Another object of this invention is to provide a novel damper motor operating on the liquid expansion hot chamber principle which will hold the fresh air damper closed until the temperature rises a predetermined amount and thereafter immediately open the fresh air damper to admit the desired minimum amount of fresh air.

Another object of this invention is to provide a novel damper motor which will provide a modulated control of the damper either through its full stroke or from its open position to any selected minimum air stream position.

Another object of this invention is to provide a novel damper motor which may be adjusted to provide a desired minimum air stream position of the damper.

Another object of this invention is to provide a novel damper motor which will return to the damper closed or safety position in event of failure of the current supply.

Another object of this invention is to provide a novel damper motor operating on the liquid expansion hot chamber principle in which a controlled and substantially constant temperature is maintained in the hot chamber to allow the motor to be installed in regions of variable ambient temperatures and air velocities.

Another object of this invention is to provide a novel damper motor having a readily adjustable operating temperature range.

Another object of this invention is to provide a novel damper motor having a readily adjustable minimum damper position.

Another object of this invention is to provide auxiliary heating means to supplement the action of the hot chamber heating means on the thermosensitive means used to maintain the hot chamber at a predetermined uniform temperature.

Another object of this invention is to provide a novel damper motor which is simple in construction, durable, certain and positive in operation, cheap to manufacture and readily and easily installed in existing units.

With these objects in mind one embodiment of my novel damper motor is illustrated in the accompanying drawing but it is to be expressly understood that this drawing is for the purposes of illustration only and should not be construed as definitive of the present invention, reference being had to the appended claims for this purpose.

In the accompanying drawing Fig. 1 is a view partly in section of one embodiment of my novel damper motor showing the relative position of the several parts;

Fig. 2 is a circuit diagram of a suitable electric circuit for use with the embodiment of my novel damper motor shown in Fig. 1; and Fig. 3 is a fragmentary detail view.

In the form shown in these figures, in which like reference characters indicate similar parts, 10 is the damper motor housing base upon which is suitably secured or formed therewith the damper motor housing 11 having a suitable top 12 secured thereto by through bolts 13. Carried within housing 11 are any suitable number of spacers 14 upon and between which is securely mounted a hot chamber 15 open at its top and closed by a suitable bottom member 16 integral therewith or secured thereto. Secured to the underside of bottom member 16 as by bolt 17 is any suitable hot chamber heater 18 provided with lead wires 19 and 20. Suitably mounted within hot chamber 15 as by the circumferential flange 21 is an expansible and contractible corrugated resilient metallic wall forming therewith an expansible and contractible vessel 22, said wall being open at its top adjacent flange 21 and suitably closed at its bottom by bottom member 23 so that a fluid tight chamber 22 is formed between the expansible and contractible corrugated wall and the wall of the hot chamber 15. Bottom member 23 is apertured at 24 to receive actuating rod or post 25 which is suitably secured thereto through the medium of washer 26 to form a fluid tight joint therewith. Post 25 is recessed at 27 to receive extension 28 of bolt 17 to act as a guide for the movements of the corrugated inner wall of expansible and contractible vessel 22. Post 25 extends through any suitable orifice 29 in top 12 and pivotally engages housing 30 as at 31, housing 30 being pivotally mounted at 32 upon bracket 33 suitably secured to top 12. Mounted for slidable adjustment in housing 30 is damper actuating lever or operator 34 designed to be connected to and operate any suitable damper operating mechanism not shown. Engaging the under surface of top 12 and extending downward into engagement with member 23 of the expansible and contractible vessel 22 is spring 35 tending to expand said corrugated wall and thus contract vessel 22.

Carried by hot chamber 15 is bracket 36 to which is secured a depending bracket 39 from which projects flexible arm 37 carrying a U-shaped thermosensitive bimetallic element 38 and electrically connected to lead 41 of heater 18. Likewise carried by bracket 39 is a flexible slotted metallic member 40 carrying adjustable contact screw 40' engaging bimetallic element 38 and having a contact in the form of a bridge 20' to complete the circuit of heater 18 through lead 20, element 38 projecting through the slot in said member 40 and at its opposite ends being mounted on arm 37 and engaging screw 40'. A bolt 42 is provided to engage a portion of member 40 below the slot and adjust the position of said member with respect to member 37 actuated by the bimetallic element 38. A suitable extension 43 of housing 11 is provided to cover and protect the just described thermostatic switch. Mounted within housing 43 as by clips 44 is auxiliary bulb 45 and bulb heater 45', bulb 45 being in communication with hot chamber 15 through capillary tube 46. Mounted across leads 19 and 20 of heater 18 as shown is auxiliary heater 47 designed to maintain the temperature in housing 43 approximately that of hot chamber 15.

Secured in any suitable position in the unit ventilator or in the enclosure being controlled is a bracket 48 to which is secured cups 49 and 50. Mounted within cup 50 and circumferentially secured thereto as at 51 to form a fluid tight joint therewith is an expansible and contractible corrugated resilient metallic wall forming therewith an expansible and contractible vessel 52 provided with an end wall 53 having a central orifice 54. Secured to the periphery of orifice 54 in end wall 53 and forming a fluid-tight joint therewith and extending axially within said corrugated wall forming the inner wall of vessel 52 is an expansible and contractible corrugated resilient metallic wall forming with said first-named corrugated wall an expansible and contractible vessel 55. The interior of vessel 55 is in communication with bulb 45 through capillary tube 56. A bolt 57 passes through bracket 48 and provides manual means for adjusting the degree of expansion of vessel 55, a lock nut 58 acting to secure bolt 57 after adjustment and a cap 59 being provided to protect the assembly.

Within cup 49 is circumferentially secured, as at 60, an expansible and contractible corrugated resilient metallic wall forming therewith an expansible and contractible vessel 61 said wall forming a fluid-tight joint with said cup and carrying an end wall 62. Passing through bracket 48 and an aperture in end wall 62 is a bolt 63 providing manual means for adjusting the degree of expansion of vessel 61, a lock nut 64 being provided to hold bolt 63 after adjustment and a cap 65 being provided to protect the assembly.

Any suitable thermostatic bulb 66 is suitably mounted in the enclosure being controlled or in the case of a unit ventilator in the sampling duct. Bulb 66 is in communication with the interior of cup 50 through capillary tube 67. Tube 67 has a branch 68 opening into the interior of cup 49. Bulb 66, tube 67, the interior of vessel 52, tube 68 and the interior of vessel 61, together constituting the liquid expansion system, are filled with any suitable expansible liquid through filling tube 69 which is thereafter sealed to prevent escape of the liquid. The hot chamber 15 as constituted by vessel 22, tube 46, bulb 45, tube 56 and the interior of vessel 55, constituting the hot chamber system, are charged with a suitable volume of volatile liquid through filling tube 70 in cup 15 which is thereafter sealed to prevent escape of the liquid.

Fig. 2 illustrates diagrammatically a suitable electric circuit for use with the above described embodiment of my novel damper motor. As above described an auxiliary heater 47 is hooked across the leads 19 and 20 of the hot chamber heater 18, lead 19 connecting directly to one side of the secondary coil of a suitable transformer 71 while lead 20 connects to the switch 40, 38 including thermosensitive bimetallic element 38 which when in contact with adjustable arm 40 completes the circuit through lead 41 to the other side of the secondary coil of transformer 71. Connected in parallel with heater 18 as by jumpers 72 and 73 and not affected by the action of bimetallic element 38 is auxiliary bulb heater 45'. When it is desired to separately control heater 45' to select the minimum air stream position for the damper the jumper 73 is removed and any suitable thermostatically operated or manually operated switch 74, or both, is connected in series with the heater 45' and the lead 19 as shown. A fan motor is diagrammatically indicated at 76 in circuit with the leads 77 to the primary of transformer 71 through a switch 78 which may be closed manually or automatically.

Assuming that the proper amounts of expanding and volatile fluids have been inserted in the liquid expansion and hot chamber systems and that the embodiment of my invention above described is properly set up then for the purposes of illustration the operation of my invention as used with a unit ventilator will now be described. When used with a unit ventilator the actuating lever 34 is connected to the mixing dampers and the hot chamber heater 18 is connected in series with the fan motor through a suitable transformer 71 if necessary. When the fan motor 76 of the unit ventilator is started, as by closing a manually operated switch 78, the circuit to heater 18 is energized, as bimetallic element 38 normally engages arm 40 at its contact 20', and heater 18 brings the temperature in hot chamber 15 to the proper predetermined operating temperature which is at least above the boiling point of the vaporizable liquid used. At the same time auxiliary heater 47 connected across the circuit of heater 18 is helping heater 18 bring the temperature in housing 43 up to the proper predetermined operating temperature. When this predetermined temperature is reached bimetallic element 38 distorts and breaks its contact with arm 40 opening the circuit to heaters 18 and 47 and thus assuring against an excessive temperature in the hot chamber 15. By adjusting the position of arm 40 by bolt 42 the operating temperature in the hot chamber 15 may be regulated as desired. If bulb heater 45' is connected in parallel with heater 18 then bulb 45 is heated with hot chamber 15 and the predetermined fixed volume of volatile liquid in bulb 45 is expanded to an amount determined by the temperature at said bulb and when a predetermined temperature has been reached passed through capillary tube 46 into hot chamber 15 where it is there volatilized to partially expand vessel 22. Expansion of vessel 22 raises post 25 and rotates housing 30 and actuating lever 34 in a counter-clockwise direction as seen in Fig. 1 to open the fresh air dampers to the predetermined minimum air stream position. If bulb heater 45' has a thermostatically operated switch 74 in circuit, as described above, then bulb 45 will not be heated until a predetermined temperature, as in the enclosure, actuates the thermostat to close switch 74 to complete the circuit to heater 45', after which bulb 45 will be heated and the liquid expanded therein and forced into hot chamber 15 where it is volatilized to partially expand vessel 22 and open the dampers to the predetermined minimum air stream position. In place of a thermostatically operated switch at 74 a manually operated switch may be used as above pointed out.

As above described, bulb 66 is assumed to be in the sample duct of the unit ventilator. When the temperature of the air in the duct reaches a predetermined point the liquid in bulb 66 by expansion acts through tube 67 and cup 50 to expand vessel 52. As vessel 52 expands the volatile liquid in vessel 55 is forced through tube 56 into bulb 45 where it is expanded and then passes through tube 46 into hot chamber 15 where it is volatilized and acts to expand vessel 22 and open the dampers allowing fresh air to pass bulb 66. Fresh air passing bulb 66 reduces its temperature and causes the expansible liquid therein to contract. Contraction of the liquid in bulb 66 draws the liquid out of cup 50 and allows vessel 52 to contract which in turn by expansion of vessel 55 draws liquid out of bulb 45 and hot chamber 15 and allows vessel 22 to contract and close the dampers thus affording a temperature control in the unit ventilator.

Regulation of the temperature at which the expansible liquid in bulb 66 will act to expand vessel 52 and force liquid into bulb 45 and hot chamber 15 to expand vessel 22 and open the dampers is obtained by expanding or contracting vessel 61 by proper adjustment of bolt 63. The more vessel 61 is contracted the more liquid will be forced into cup 50 to expand vessel 52 and by contracting vessel 55 force volatile liquid into bulb 45 whereby less expansion of the liquid at bulb 66 effects operation of vessel 22 and the lower the temperature of operation will be, while if vessel 61 is expanded less liquid will occupy vessel 52 and the more the liquid in bulb 66 must be expanded to effect operation of vessel 55 to thereby inject vaporizable liquid into vessel 22, whereby the temperature of operation will be raised.

Control of the minimum air flow position of the damper from its fully closed to its fully open position is had by expanding or contracting vessel 55 by the proper adjustment of bolt 57. As vessel 55 is contracted more liquid will be forced toward vessel 22 through bulb 45 and the heater thereat will force more volatile liquid into hot chamber 15 for a given temperature, increasing the volume of liquid effective to expand vessel 22 and the minimum air stream position of the damper will be increased. As vessel 55 is expanded liquid is drawn out of bulb 45 and hot chamber 15 into chamber 55 reducing the volume of liquid effective to expand vessel 22 and the minimum air flow position of the damper will be reduced.

It is now apparent that the present invention provides a novel damper motor which will return the damper to the damper closed or safety position upon failure of the current because, should the current fail, bulb 45 and hot chamber 15 will cool and the vaporized liquid in chamber 15 will condense allowing vessel 22 to contract and move actuating lever 34 in a clockwise direction as seen in Fig. 1 to close the damper.

It should now be apparent that the present invention provides a novel damper motor for use in unit ventilators and similar devices which operates on the liquid expansion hot chamber principle allowing the selection of any desired minimum air stream position of the damper either manually or automatically at the time the ventilator is put in operation or thereafter, which minimum air stream position may be adjusted from the fully open to the fully closed position of the damper with a modulated control of damper movement from the minimum air stream position to open position. At the same time the present invention provides novel means for readily adjusting the operating temperature range of the motor and novel means for returning the damper motor to the damper closed or safety position upon failure of the electric current, and the device is simple in construction, durable, certain and positive in operation, cheap to manufacture and readily and easily installed in existing units.

To those skilled in the art changes to or modifications of the above described illustrative embodiment of the present invention will now be suggested without departing from the inventive concept of the present invention. For instance auxiliary heater 47 may be omitted if the action of heater 18 is sufficient to operate the bimetallic element 38 without too great a temperature gradient between hot chamber 15 and bimetallic element 38 or springs may or may not be used with vessels 22, 52, 55 and 61 to provide or supplement their resiliency. Reference should therefore be had to the appended claims to determine the scope of the present invention.

What is claimed is:

1. In an apparatus of the class described, an expanding and contracting vessel, an electric heater for heating said vessel, an auxiliary vessel in communication with said first named vessel, temperature responsive means for forcing vaporizable liquid into said auxiliary vessel, an electric heater for heating said auxiliary vessel to force said vaporizable liquid into said first named vessel and temperature responsive means responsive to the temperature of said heaters to open the circuit to at least said first named heater.

2. In an apparatus of the class described, an expanding and contracting vessel, an electric heater for said vessel, an auxiliary heater connected in parallel with said first named heater, temperature responsive means responsive in part to said auxiliary heater to open the circuit to said heaters, an auxiliary vessel in communication with said first named vessel, an electric heater for said auxiliary vessel, and temperature responsive means for forcing a vaporizable liquid into said auxiliary vessel where said vaporizable liquid is heated and forced to said first named vessel and there vaporized to operate said first named vessel.

3. In an apparatus of the class described, an expanding and contracting vessel, means for heating said vessel, a heated auxiliary vessel in communication with said first named vessel, means for heating said auxiliary vessel, a source of vaporizable liquid in communication with said auxiliary vessel and thence with said first named vessel, manual means for adjusting the effective volume of said vaporizable liquid acted on by said auxiliary vessel, and temperature responsive means for forcing said vaporizable liquid into said auxiliary vessel where said vaporizable liquid is heated and thereupon the same liquid is forced to said first named vessel and there vaporized to operate said first named vessel.

4. In an apparatus of the class described, including a damper operator, an expanding and contracting vessel to operate said damper operator, means for heating said vessel, means for determining the minimum air flow position of said damper operator including an auxiliary vessel in communication with said first named vessel, and means for heating said auxiliary vessel to force vaporizable liquid therefrom into said first-named vessel for vaporization therein to expand the same and initially actuate said damper operator, a source of vaporizable liquid in communication with said auxiliary vessel, and temperature responsive means for forcing said vaporizable liquid into said auxiliary vessel to displace an additional amount of said vaporizable liquid into said first named vessel.

5. In an apparatus of the class described, including a damper operator, an expanding and contracting vessel to operate said damper operator, means for heating said vessel, means for determining the minimum air flow position of said damper operator and the temperature range of operation of said vessel including a heated auxiliary vessel in communication with said first named vessel, a vaporizable liquid in said auxiliary vessel, a source of vaporizable liquid in communication with said auxiliary vessel, manual means for adjusting the effective volume of said vaporizable liquid acted on by said auxiliary vessel, and temperature responsive means for forcing said vaporizable liquid into said auxiliary vessel to heat said liquid and force it to said first named vessel where it is vaporized to operate said first named vessel.

6. In an apparatus of the class described, an expanding and contracting vessel, means for heating said vessel, a heated auxiliary vessel in communication with said first named vessel, an expanding and contracting vessel in communication with said auxiliary vessel, a vaporizable liquid in said heated auxiliary vessel and said second expanding and contracting vessel, manual means for regulating the effective volume of said vaporizable liquid in said last named vessel to select the minimum contracted operating position of said first named vessel, and means for forcing vaporizable liquid into said heated auxiliary vessel and thence into said first named vessel where it is vaporized to operate said first named vessel including a third expanding and contracting vessel in actuating relation to said second expanding and contracting vessel and a temperature responsive liquid therein for operating said second named vessel.

7. In an apparatus of the class described, an expanding and contracting vessel, means for heating said vessel, a heated auxiliary vessel in communication with said first named vessel, an expanding and contracting vessel in communication with said auxiliary vessel, a vaporizable liquid in said heated auxiliary vessel and said second expanding and contracting vessel, manual means for regulating the effective volume of said vaporizable liquid in said last named vessel to select the minimum contracted operating position of said first named vessel, and means for forcing said vaporizable liquid into said auxiliary vessel and thence into said first named vessel where it is vaporized to operate said first named vessel including a third expanding and contracting vessel in actuating relation to said second expanding and contracting vessel, a temperature responsive expanding liquid therein for actuating said second named expanding and contracting vessel and manual means for adjusting the effective volume of said expanding liquid to select the temperature range of the apparatus.

8. In an apparatus of the class described, a hot chamber, a heater therefor, an auxiliary vessel of fixed volume in communication with said hot chamber, a heater associated with said auxiliary vessel for heating the same, means for discontinuing the operation of said first-named heater when a predetermined temperature is reached, an expanding and contracting vessel in communication with said heated auxiliary vessel, a vaporizable liquid in said heated auxiliary vessel and said expanding and contracting vessel, and thermostatic means for contracting said expanding and contracting vessel to force said vaporizable liquid into said heated auxiliary vessel.

9. In an apparatus of the class described, a hot chamber, a heater therefor, an auxiliary vessel of fixed volume in communication with said hot chamber, a heater associated with said auxiliary vessel for heating the same, means for discontinuing the operation of said first-named heater when a predetermined temperature is reached, an expanding and contracting vessel in communication with said heated auxiliary vessel, a vaporizable liquid in said heated auxiliary vessel and said expanding and contracting vessel, means for regulating the amount of said vaporizable liquid in said expanding and contracting vessel, and thermostatic means for contracting said expanding and contracting vessel to force said vaporizable liquid into said heated auxiliary vessel.

10. In an apparatus of the class described, a hot chamber, a heated auxiliary vessel in communication with said hot chamber, an expanding and contracting vessel in communication with said heated auxiliary vessel, a vaporizable liquid in said heated auxiliary vessel and second named vessel, and thermostatic means for contracting said second named vessel to force said vaporizable liquid into said heated auxiliary vessel including means containing a temperature responsive liquid in actuating relation to said second named vessel and manual means for adjusting the effective volume of said temperature responsive liquid.

11. In an apparatus of the class described, an expanding and contracting vessel, an electric heater for said vessel, temperature responsive means responsive to the temperature of said electric heater for said vessel to open the circuit to said heater, an auxiliary vessel in communication with said vessel, an electric heater for said auxiliary vessel, and temperature responsive means for forcing a vaporizable liquid into said auxiliary vessel where said vaporizable liquid is heated and forced to said first named vessel where it is vaporized to operate said first named vessel.

12. In an apparatus of the class described, an expanding and contracting vessel, an electric heater for said vessel, a temperature responsive circuit breaker in the circuit of said electric heater, an auxiliary heater in parallel in the circuit of said electric heater and controlled by said circuit breaker, an auxiliary vessel in communication with said vessel, and an electric heater for said auxiliary vessel in parallel in the circuit of said first named electric heater and not affected by said circuit breaker.

13. In an apparatus of the class described, an expanding and contracting vessel, an electric heater for said vessel, a temperature responsive circuit breaker in the circuit of said electric heater, an auxiliary vessel in communication with said vessel, and an electric heater for said auxiliary vessel in parallel in the circuit of said first named electric heater and not affected by said circuit breaker.

14. In an apparatus of the class described, an expanding and contracting vessel, means for heating said vessel, a second expanding and contracting vessel in communication with said first named vessel, a vaporizable liquid in said second named vessel, means for predeterminately heating a fixed volume of said vaporizable liquid on its way from said second to said first vessels, manual means for adjusting the effective volume of said vaporizable liquid in said second named vessel, and temperature responsive means for forcing said vaporizable liquid from said second named vessel into said first named vessel where it is vaporized to operate said first named vessel.

15. In an apparatus of the class described, an expanding and contracting vessel, means for heating said vessel, a second expanding and contracting vessel in communication with said first named vessel, a vaporizable liquid in said second named vessel, means for predeterminately heating a fixed volume of said vaporizable liquid on its way from said second to said first vessels, manual means for adjusting the effective volume of vaporizable liquid in said second named vessel, and means for forcing said vaporizable liquid from said second named vessel into said first named vessel where it is vaporized to operate said first named vessel and including means containing an expanding liquid in operating relation to said second named vessel, and manual means for adjusting the effective volume of said expanding liquid.

16. In an apparatus of the class described, an expanding and contracting vessel, heating means for said vessel, temperature responsive means for injecting a vaporizable liquid into said vessel where the vaporizable liquid is vaporized to operate said vessel, and an auxiliary heated vessel between said temperature responsive injecting means and said vessel to predeterminately heat a fixed volume of the same vaporizable liquid and inject it into said first named vessel and determine the initial pressure in said vessel preliminarily to the operation of said temperature responsive means.

17. In an apparatus of the class described, an expanding and contracting vessel, an electric heater for said vessel, a temperature responsive circuit breaker in the circuit of said electric heater subject to the temperature of said electric heater to maintain said temperature constant, temperature responsive means for injecting a vaporizable liquid into said vessel where the vaporizable liquid is vaporized to operate said vessel, and an auxiliary heated vessel between said temperature responsive injecting means and said vessel to predeterminately heat a fixed volume of said vaporizable liquid and determine the initial pressure in said vessel.

18. In an apparatus of the class described, an expanding and contracting vessel, heating means for said vessel, temperature responsive means for injecting a vaporizable medium into said vessel, an auxiliary vessel between said injecting means and said vessel, heating means for said auxiliary vessel and operable to inject vaporizable medium therein into said first named vessel before said temperature responsive injecting means becomes effective, manual means for adjusting the effective volume of the vaporizable liquid in said injecting means to predetermine the initial operation of said vessel, and manual means for adjusting the temperature range of said injecting means to determine the subsequent operation of said vessel.

19. In a damper motor of the class described, an expanding and contracting vessel, means for heating said vessel, temperature responsive means for injecting a vaporizable liquid into said vessel where it is vaporized to operate said vessel, and means in the path of injection of said vaporizable liquid for heating the vaporizable liquid to effect injection thereof into said vessel to predetermine the initial pressure in said vessel before said temperature responsive means assumes control.

20. In a damper motor of the class described, an expanding and contracting vessel, means for heating said vessel, temperature responsive means for injecting a vaporizable liquid into said vessel where it is vaporized to operate said vessel, means in the path of injection of said vaporizable liquid for heating said vaporizable liquid to effect injection thereof into said vessel before said temperature responsive means assumes control, and manual means for adjusting the temperature range of said temperature responsive injecting means to determine the range of operation of said motor.

21. In a damper motor of the class described, an expanding and contracting vessel, means for heating said vessel, temperature responsive means for injecting a vaporizable liquid into said vessel where it is vaporized to operate said vessel, means in the path of injection of said vaporizable liquid for heating the vaporizable liquid to effect injection thereof into said vessel to predetermine the initial pressure in said vessel before said temperature responsive means assumes control, and manual means for adjusting said temperature responsive means to vary both the initial pressure in said vessel and the temperature range of said temperature responsive means.

22. In a damper motor of the class described, an expanding and contracting vessel, means for heating said vessel, temperature responsive means for injecting a vaporizable liquid into said vessel where it is vaporized to operate said vessel, means in the path of said vaporizable liquid for heating the vaporizable liquid to effect injection thereof into said vessel independently of the response of said injecting means to temperature, and manual means for determining the effective volume of the vaporizable liquid in said injecting means to predetermine the initial pressure in said vessel.

23. In a damper motor of the class described, an expanding and contracting vessel, means for heating said vessel, temperature responsive means for injecting a vaporizable liquid into said vessel where it is vaporized to operate said vessel, means for heating the vaporizable liquid before injection into said vessel, manual means for determining the effective volume of the vaporizable liquid in said injecting means to predetermine the initial pressure in said vessel, and manual means for adjusting the temperature range of said temperature responsive injecting means to determine the range of operation above said initial pressure.

JOHN E. DUBE.